(12) United States Patent
Dupuis

(10) Patent No.: US 7,993,564 B2
(45) Date of Patent: Aug. 9, 2011

(54) METHOD AND INSTALLATION PRODUCING PREFORMS

(75) Inventor: Alain Dupuis, Geneva (CH)

(73) Assignee: Olilab Ltd., North Point (HK)

( * ) Notice: Subject to any disclaimer, the term of this patent is extended or adjusted under 35 U.S.C. 154(b) by 26 days.

(21) Appl. No.: 12/296,591

(22) PCT Filed: Apr. 3, 2007

(86) PCT No.: PCT/IB2007/000901
§ 371 (c)(1),
(2), (4) Date: Oct. 9, 2008

(87) PCT Pub. No.: WO2007/119139
PCT Pub. Date: Oct. 25, 2007

(65) Prior Publication Data
US 2009/0160094 A1 Jun. 25, 2009

(30) Foreign Application Priority Data
Apr. 14, 2006 (FR) ...................... 06 03334

(51) Int. Cl.
*B28B 3/06* (2006.01)
(52) U.S. Cl. ............... 264/297.3; 264/328.4; 264/328.5; 264/328.8
(58) Field of Classification Search ............... 264/297.3, 264/328.4, 328.5, 328.8
See application file for complete search history.

(56) References Cited

U.S. PATENT DOCUMENTS

| 3,918,864 | A | * | 11/1975 | Braun | 425/129.1 |
| 5,643,620 | A | * | 7/1997 | Brun, Jr. | 425/556 |
| 5,798,128 | A | * | 8/1998 | Dumazet et al. | 425/147 |
| 5,807,592 | A | | 9/1998 | Alieri | |
| 5,985,201 | A | * | 11/1999 | Pierre et al. | 264/328.18 |
| 6,264,462 | B1 | * | 7/2001 | Gallagher | 425/574 |
| 2004/0035491 | A1 | * | 2/2004 | Castellano | 141/27 |
| 2005/0241721 | A1 | | 11/2005 | Ritz et al. | |
| 2005/0248054 | A1 | * | 11/2005 | Bates et al. | 264/237 |
| 2007/0297279 | A1 | * | 12/2007 | Gao et al. | 366/160.4 |

FOREIGN PATENT DOCUMENTS

| WO | WO 03/047831 | 6/2003 |
| WO | WO 2004/062874 | 7/2004 |
| WO | WO 2005/075171 | 8/2005 |
| WO | WO 2005/102642 | 11/2005 |

* cited by examiner

*Primary Examiner* — Yogendra N Gupta
*Assistant Examiner* — Jeremiah Smith
(74) *Attorney, Agent, or Firm* — Frommer Lawrence & Haug LLP; Ronald R. Santucci

(57) ABSTRACT

A PET granule hopper and dryer (1) feeding an extruder (2). The extruder in turn via a rotary seal, feeds a metering wheel (3) on which there are metering devices. An injection-compression wheel (4) supporting injection-compression devices (5) is positioned after the metering wheel (3). If the installation is not designed for continuous feeding of a blower for converting the preformed into packagings, a perform cooler is provided, by means of a cooling wheel (6) equipped with a set of water-cooled devices (1) blowing air onto the performs before they are taken away for storage.

6 Claims, 3 Drawing Sheets

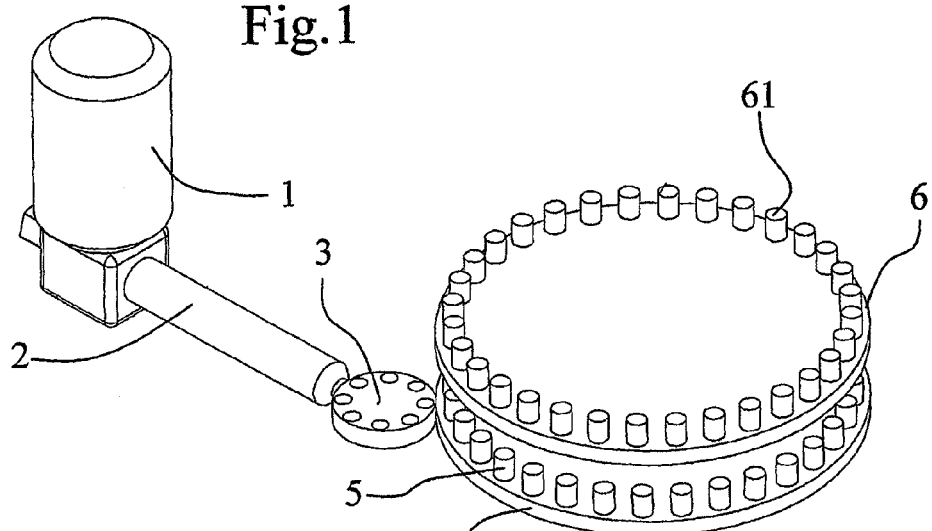
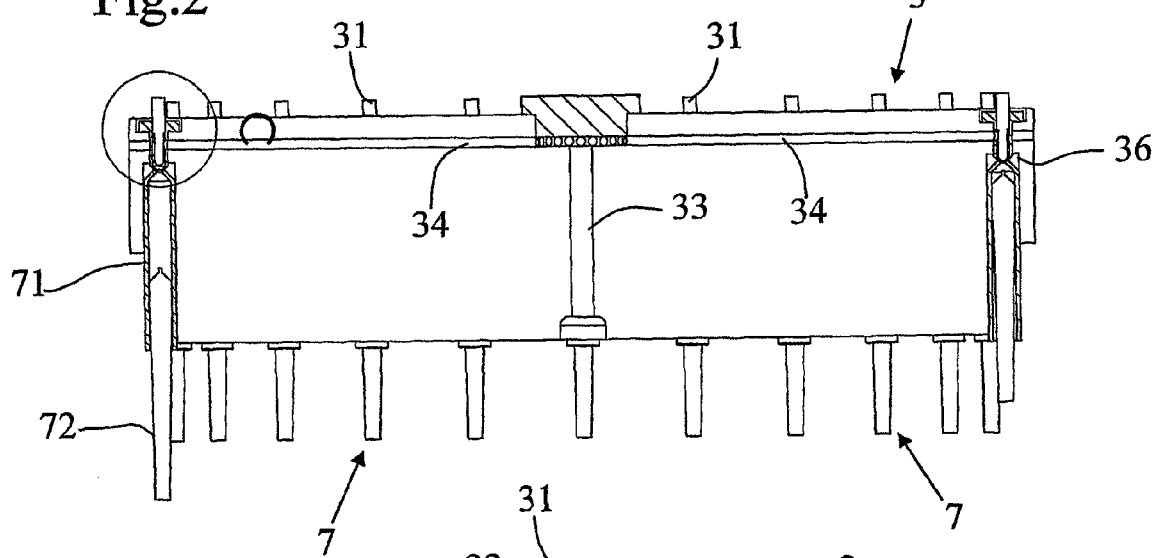
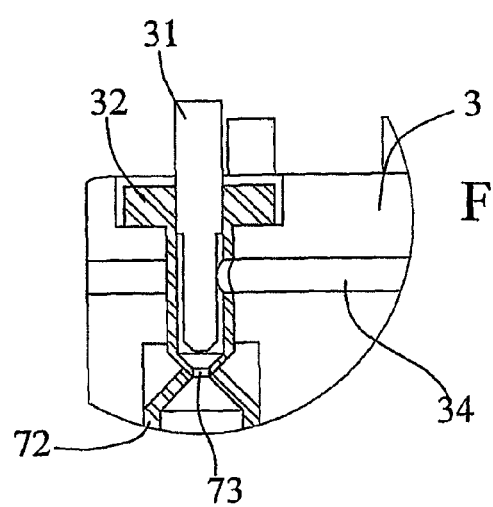

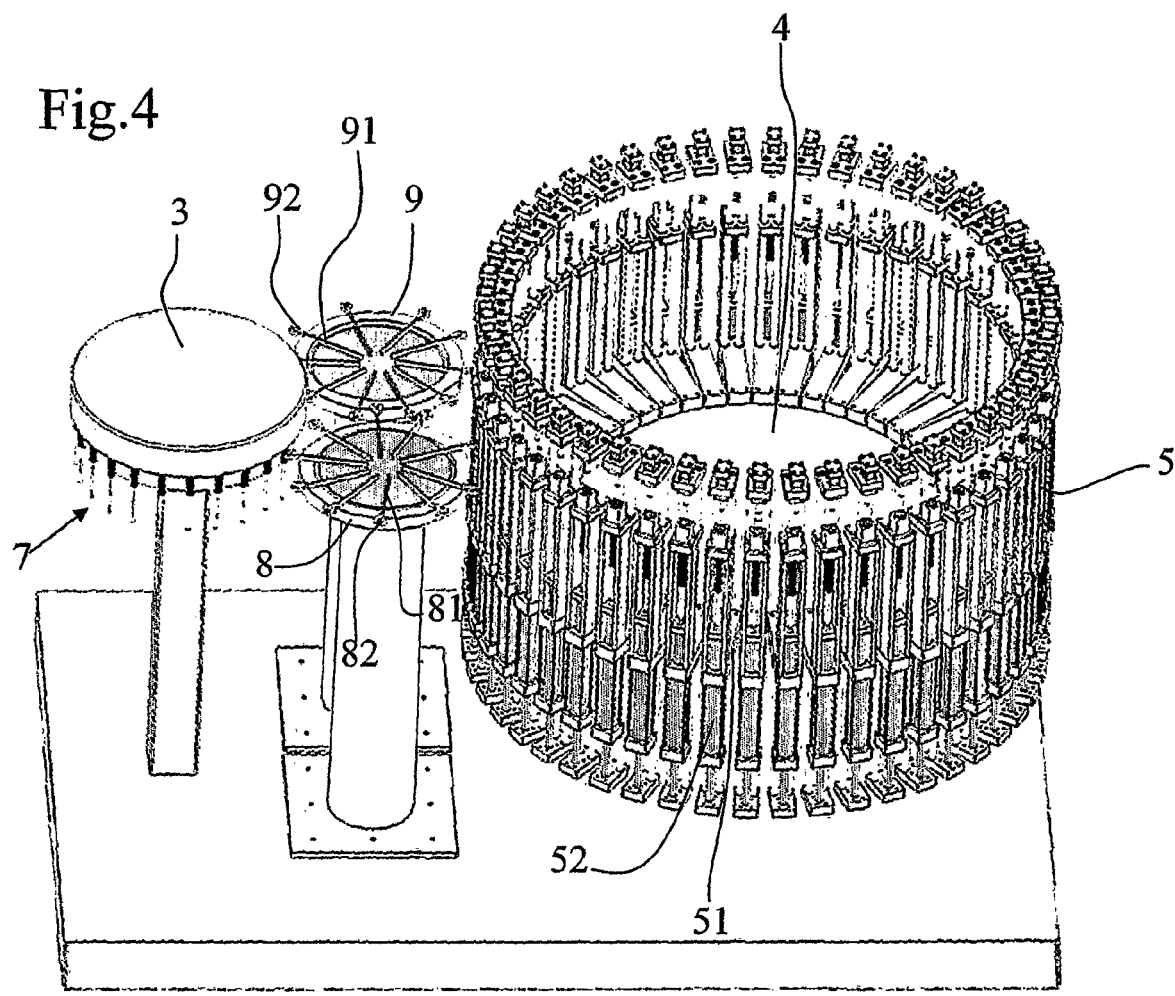
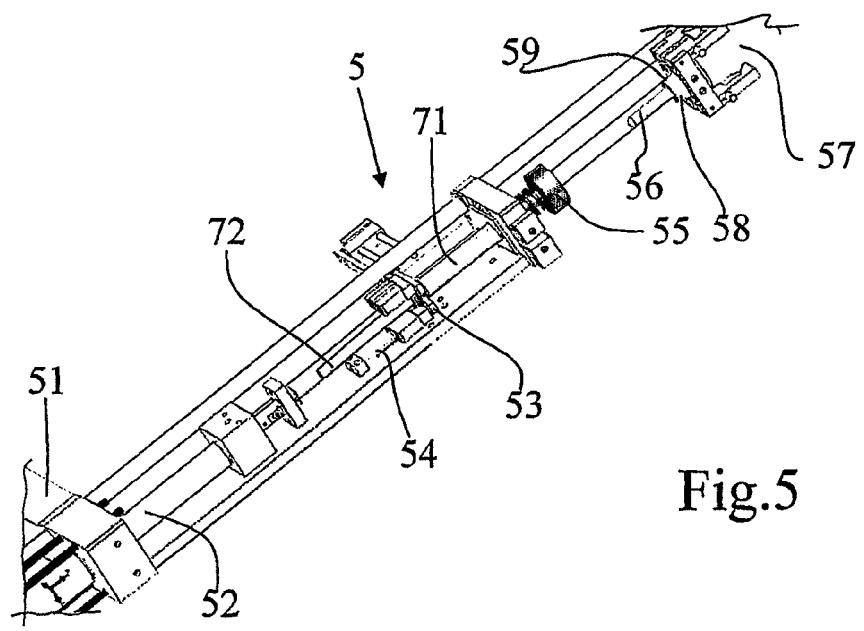

METHOD AND INSTALLATION PRODUCING PREFORMS

This application is a 371 of PCT/IB2007/000901 filed on Apr. 3, 2007, published on Oct. 25, 2007 under publication number WO 2007/119139 A1 which claims priority benefits from French Patent Application Number 06 03334 filed Apr. 14, 2006, the disclosure of which is incorporated herein by reference.

The present invention concerns a method for continuous production by injection-compression of preforms for the fabrication of synthetic material packaging, such as bottles, by means of an extruder, and an installation for implementing the method.

Synthetic material packaging, for example PET bottles, is manufactured by drawing-blowing a preform, generally by one of two methods:

By the "two-stage" method, by first fabricating preforms using an injection press and a multi-imprint mold. The injection press transforms the PET granules into preforms. These preforms, produced in successive batches (equal to the number of imprints of the mold) and stored at room temperature, are later fed to a blowing machine that may or may not be located nearby.

By the "one step" method, by fabricating preforms and bottles on the same machine continuously. This machine transforms PET granules into bottles that are directly usable.

The "two stage" method fabricates a number of preforms at the same time but when the preforms reach the blowing machine they are at room temperature and they must be heated to the blowing temperature, which is of the order of 100° C., which on the one hand requires special management of the preforms (storage, transportation, handling) and on the other hand makes production more costly. The "one stage" method saves energy because, when they reach the blowing stations, the preforms are at a temperature of the order of 60° C., saving the energy necessary to heat the preforms from room temperature to 60° C.

Whichever method is adopted, manufacture of the preform necessitates transformation of the thermoplastic synthetic material, here PET, to obtain the preform from a cooled mold.

The granules are perfectly dry (dried at approximately 160° C. for a few hours) and are converted by an extruder into a molten material at approximately 270° C.

There are three known principles for obtaining a preform from the molten plastic material:

Standard injection: The hot material is injected into the static mold in two phases: a dynamic phase of filling the mold, a static holding phase for replenishing the preform during cooling. The injection pressure generally exceeds 1000 bars.

This technique implies high mechanical stresses on the material and a machine offering high performance in terms of mold closure force and injection pressure. A shut-off valve system is necessary for closing the injection threshold at the end of the holding phase.

Compression: An exact quantity of molten material is introduced into the mold, the punch of which is mobile. The compression process is executed by moving the punch, which stresses the material to form the preform. This system is economic in machine terms (no injection system, low mechanical stresses), of high performance in terms of preform quality (no injection point), but difficult to implement because of depositing an exact quantity of hot material in the mold.

Injection-compression: An exact quantity of hot material is injected into the mold by a metering device with the mobile punch of the mold retracted to facilitate transfer of the material into the mold; when injection is finished the punch executes the compression process to form the preform. The injection pressure remains below 500 bars; the mechanical stresses are low.

An object of the present invention is to improve the production of preforms to render it continuous and better adapted to the throughput of blowing machines, especially rotary machines. On the other hand, the invention can be used even in the "two stage" method, the production of preforms in accordance with the invention being faster.

An injection metering device takes the form of a piston mobile relative to a cylinder and constitutes a syringe capable of receiving and then injecting the molten material. The metering wheel, equipped with a rotary connection to the extruder, which is fixed, turns continuously and fills each injection metering device over one complete revolution. The injection metering devices arrive empty at the metering wheel and leave it filled with a quantity of material calculated as a function of the weight of the preform. During filling the metering wheel distributes the molten material radially via passages that feed the injection metering devices. While filling an injection metering device, a valve distributor is open and allows the material to pass toward the injection metering device. During this filling phase, the piston of the injection metering device is preloaded by a ram to provide a counter-pressure during filling of the injection metering device. On reaching the metering point, i.e. the end of the stroke of the piston of the injection metering device that corresponds to the required quantity of material, the valve distributor is closed, after which the ram pulls the piston of the injection metering device over a stroke calculated to decompress the material inside the injection metering device.

An injection-compression module supports a preform mold with one imprint. During one revolution of the injection-compression wheel each injection-compression module executes a cycle to manufacture a preform in accordance with the following sequence: closing the mold followed by injecting the molten material into the mold with retraction of the punch of the mold, followed by compression of the material by the punch, followed by cooling the material for a calculated time, followed by opening the mold, followed by ejecting the preform. The mold of the injection-compression module has at its end opposite the punch an injection threshold (a hole for entry of the molten material). The end of the "syringe" constituting the metering device faces the injection threshold and the material is pushed into the mold by the piston of the metering device. At the end of the stroke the piston remains in place and shuts off the injection threshold until the injected material solidifies and the preform is withdrawn. In the prior art filling via the injection threshold is effected via a circuit in which the molten material is pushed and when the dose is injected into the mold of the injection-compression module a valve must be closed until the material solidifies. Controlling this circuit (molten material, valves) is complicated. The method of the invention using the metering device that remains in place until the preform is removed solves this problem.

During one revolution of the injection-compression wheel, each injection-compression module executes the injection-compression cycle described above to manufacture a preform, recover the preform using take-up means, and move each injection metering device onto the metering wheel to be refilled.

The advantage of this method is the continuous production of preforms at high speed, which enables feeding of a downstream rotary blowing machine forming the packaging that also operates at high speed. The preforms leaving the preform production machine are at a temperature of approximately 60° C. and it suffices to heat them to the blowing temperature, which is approximately 100° C., which can be effected faster and using less energy.

In one embodiment, after the injection-compression cycle in the mold, the preform is transferred and cooled in cooling molds located on a preform cooling wheel.

This is useful if continuously feeding a blowing installation for manufacturing the packaging is not required.

In another embodiment, the preforms taken up are routed directly to a blowing installation for forming the packaging.

This is the preferred embodiment, exploiting the high rate of production of preforms and saving energy for heating the preforms before blowing.

In one embodiment, the installation is characterized by the fact that a third wheel, the preform cooling wheel, located vertically in alignment with the synchronously-turning injection-compression wheel, is provided with preform cooling molds.

If the preforms must be stored before they are moved to a blowing machine, cooling may be necessary.

The invention will be described in more detail with the assistance of the appended drawing.

FIG. 1 is a diagrammatic perspective view of an installation of the invention.

FIG. 2 is a section of the metering wheel in a plane passing through the rotation axis of said wheel.

FIG. 3 is an enlarged view of a detail of FIG. 2.

FIG. 4 is a perspective view of a portion of the installation showing certain details.

FIG. 5 is a perspective view of an injection-compression device.

Figure 6:
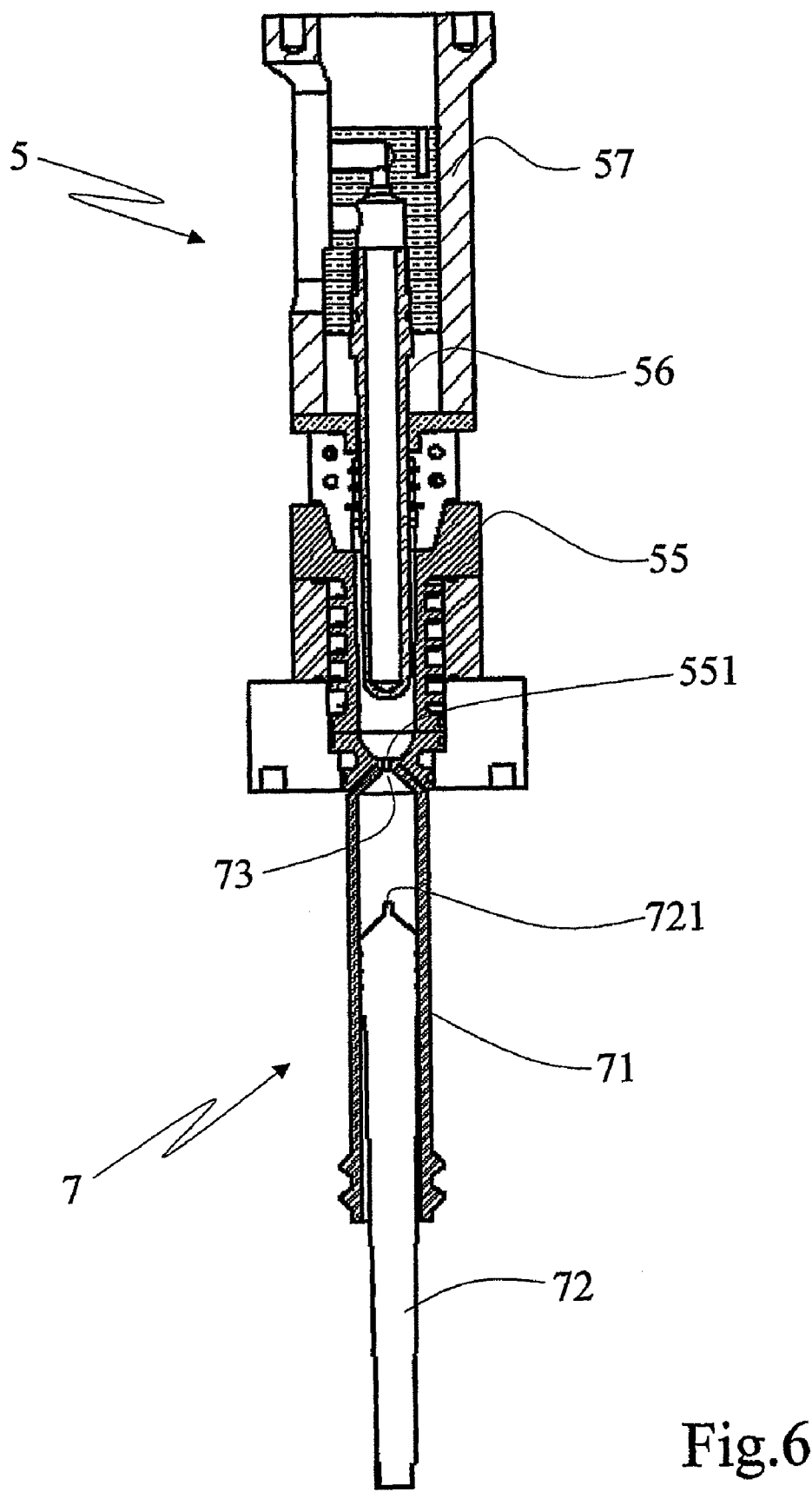
FIG. 6 is a view in section of a metering device and an injection-compression module assembled together.

FIG. 1 shows diagrammatically the main elements of an installation for implementing the method of the invention. A PET granule hopper-dryer feeds an extruder 2. In turn, the extruder feeds a metering wheel 3 on which metering devices (not shown) are located. An injection-compression wheel 4 supporting injection-compression modules 5 is disposed on the downstream side of the metering wheel 3. If the installation is not intended to feed continuously a blowing machine for converting the preforms into packaging, the preforms are cooled by a preform cooling wheel 6 having a set of devices 61 for blowing air onto the preforms before they are taken up for storage.

The metering wheel 3 includes housings 36 in which metering devices 7 are placed. Each metering device 7 has a tubular part 71 in which a sealed piston 72 moves. The tubular part 71 terminates in an orifice 73 through which the extruded material is pushed into the metering device 7 and through which it subsequently leaves to feed the injection-compression devices. The housings 36 communicate with a shut-off valve 31, 32 (FIGS. 2, 3). Said shut-off valve comprises a seat 32 and a piston 31. Each seat 32 communicates via a radial opening with a radial passage 34 of the metering wheel 3 and also has an orifice facing the orifice 73 of the metering device 7. All the radial passages 34 are fed with extruded material via an axial passage 33 of the wheel 3, itself fed by the extruder 2. When a metering device 7 is placed in a housing 36, the piston 31 is retracted to free the passage and to allow the extruded material to pass into the metering device. Entry of the extruded material under pressure causes the piston 72 to retract. When the metering device contains the predetermined quantity of material, the piston 31 descends again and shuts off the passage to the metering device. During filling the piston 72 is subjected to a counter-pressure and after filling it is retracted to decompress the extruded material. The quantity of material in the metering device is a function of a number of parameters such as the feed pressure, the diameter of the orifice 73, the time for which the shut-off valve 31, 32 remains open, etc. A number of metering devices is disposed on the metering wheel 3. Each metering device must be filled over approximately two-thirds of a revolution of the metering wheel 3. It is then transferred to the injection-compression wheel 4 and replaced by an empty metering device from the latter wheel 4. The exchange of metering devices 7 between the wheels 3 and 4 is described with the assistance of FIG. 4.

FIG. 4 shows the metering wheel 3 with the metering devices 7 mounted on a vertical support, two transfer wheels 8 and 9 disposed on vertical supports and the injection-compression wheel 4 with the injection-compression devices 5 regularly distributed at its periphery. The wheel 8 has radial arms 81 with a holding device 82. Each arm 8 takes up a full metering device 7 from the wheel 3 and places it in an injection-compression device 5 of the wheel 4. The wheel 9 also has radial bars 91, 92 identical to the radial arms 81, 82 for taking up the empty metering devices 7 from the wheel 4 and moving them to the wheel 3 for refilling. The four wheels 3, 4, 8 and 9 turn in the same direction. The holding devices 82, 92 can be clamps controlled by a cam specific to each wheel 8, 9 or equivalent other devices for taking up at the appropriate time a full or empty metering device and leaving it on the wheel 4 or 3.

Each injection-compression device 5 is fixed to the wheel 4 by a radial support 51. The lower portion of the device 5 includes a ram 52. Holding means 53 above the piston 51 hold the metering device 7. A spring 54 causes the metering device 7 to be lodged in the lower portion of a die or mold 55. The ram 52 causes the piston 72 of the metering device 7 to inject material into the mold 55. The piston 72 of the metering device 7 (FIG. 6) has a nipple 721 that is inserted into the orifice 73 of the metering device and shuts off the injection threshold 551 of the mold 55 when all of the extruded material has entered the mold 55. A punch 56 attached to a mobile part 57 enters the mold 55 to form the preform. For fabricating preforms intended to become bottles, a threaded upper portion of the preform is formed in the upper part of the punch 56. This part is formed of two complementary jaws 58, 59. When the preform is formed the device 57 is retracted, the jaws 58, 59 are moved apart and the preform is recovered by appropriate means either to feed a blowing machine continuously or to be stored.

The empty metering devices on the metering wheel 3 must be filled during approximately 75% of a revolution of the wheel 3, which leaves sufficient time. On the injection-compression wheel 4 the exchange of metering devices is effected over approximately 15%, injection over approximately 25%, compression and solidification of the preform over approximately 40%, opening, ejecting and closing the mold over approximately 25% of a complete revolution of the wheel 4. In one embodiment the metering wheel 3 includes 24 metering devices and the injection-compression wheel 4 includes 48 devices 5.

The installation described enables a high continuous throughput. As mentioned above, on leaving the wheel 4 the preforms either continue to a blowing installation, so saving energy on heating, or are stored to be blown subsequently.

The invention claimed is:

1. Method for continuous production by injection-compression of preforms for the manufacture of synthetic material packaging, such as bottles, comprising the following steps:

a) converting raw material in an extruder and obtaining an extruded material at the optimum temperature,
b) continuously filling with a predetermined quantity of the extruded material injection metering devices situated on the periphery of a continuously turning metering wheel and comprising a cylindrical body having an orifice and a piston, wherein the metering wheel comprises radial passages that are directly coupled and feed the metering devices and wherein the radial passages are fed via an axial passage of the metering wheel, the axial passage fed by an extruder;
c) successively passing full injection metering devices from the metering wheel onto a continuously turning injection-compression wheel having at its periphery a plurality of injection-compression modules,
d) during one revolution of the injection-compression wheel, manufacture of a preform by each injection-compression module, recovery of the preform by take-up means and passage of each injection metering device onto the metering wheel for refilling,
wherein:
the manufacture of each preform on the injection-compression wheel is effected by injecting the extruded material into an injection-compression module, displacing the piston of an injection metering device through an injection threshold of the mold of said module continuous with said orifice of the injection metering device until the end of said piston of the injection metering device shuts off the injection threshold and thereafter by advancing a punch of the injection-compression mold that was retracted during injection of the extruded material into the module to form the preform by compression, and
the piston of the injection metering device remains in the position shutting off the injection threshold until the preform solidifies.

2. Method according to claim 1, wherein after compression in the mold the preform is cooled in a cooling mold on a preform cooling wheel.

3. Method according to claim 1, wherein the preforms taken up are routed directly to a blowing installation for forming packaging.

4. Method according to claim 2, wherein the preforms taken up are routed directly to a blowing installation for forming packaging.

5. Method for continuous production by injection-compression of preforms for the manufacture of synthetic material packaging, such as bottles, comprising the following steps:
converting raw material in an extruder and obtaining an extruded material at the optimum temperature;
continuously filling with a predetermined quantity of the extruded material injection metering devices situated on the periphery of a continuously turning metering wheel and comprising a cylindrical body having an orifice and a piston, wherein the metering wheel comprises radial passages that feed the metering devices and wherein the radial passages are fed via an axial passage of the metering wheel, the axial passage fed by an extruder;
successively passing full injection metering devices from the metering wheel onto a continuously turning injection-compression wheel having at its periphery a plurality of injection-compression modules;
during one revolution of the injection-compression wheel, manufacture of a preform by each injection-compression module, recovery of the preform by take-up means and passage of each injection metering device onto the metering wheel for refilling, the manufacture of each preform on the injection-compression wheel is effected by injecting the extruded material into an injection-compression module;
displacing the piston of an injection metering device through an injection threshold of the mold of said module continuous with said orifice of the injection metering device until the end of said piston of the injection metering device shuts off the injection threshold and thereafter by advancing a punch of the injection-compression mold that was retracted during injection of the extruded material into the module to form the preform by compression; and
the piston of the injection metering device remains in the position shutting off the injection threshold until the preform solidifies
wherein each of the metering devices are filled over about two-thirds of a revolution of the metering wheel.

6. Method for continuous production by injection-compression of preforms for the manufacture of synthetic material packaging, such as bottles, comprising the following steps:
converting raw material in an extruder and obtaining an extruded material at the optimum temperature;
continuously filling with a predetermined quantity of the extruded material injection metering devices situated on the periphery of a continuously turning metering wheel and comprising a cylindrical body having an orifice and a piston, the piston including a nipple, wherein the metering wheel comprises radial passages that feed the metering devices and wherein the radial passages are fed via an axial passage of the metering wheel, the axial passage fed by an extruder;
successively passing full injection metering devices from the metering wheel onto a continuously turning injection-compression wheel having at its periphery a plurality of injection-compression modules;
during one revolution of the injection-compression wheel, manufacture of a preform by each injection-compression module, recovery of the preform by take-up means and passage of each injection metering device onto the metering wheel for refilling, the manufacture of each preform on the injection-compression wheel is effected by injecting the extruded material into an injection-compression module;
displacing the piston of an injection metering device through an injection threshold of the mold of said module continuous with said orifice of the injection metering device until the end of said piston of the injection metering device shuts off the injection threshold, wherein the nipple corresponding to the piston is inserted into the orifice of the metering device for shutting off the injection threshold when all of the extruded material has entered the mold, and thereafter by advancing a punch of the injection-compression mold that was retracted during injection of the extruded material into the module to form the preform by compression; and
the piston of the injection metering device remains in the position shutting off the injection threshold until the preform solidifies.

* * * * *